United States Patent

[11] 3,598,498

| [72] | Inventor | Hans Kristian Holmen<br>Trondheim, Norway |
|---|---|---|
| [21] | Appl. No. | 844,375 |
| [22] | Filed | July 24, 1969 |
| [45] | Patented | Aug. 10, 1971 |
| [73] | Assignee | Sintef<br>Trondheim, Norway |
| [32] | Priority | July 29, 1968 |
| [33] | | Norway |
| [31] | | 2975/68 |

[54] ADJUSTABLE DEVICE FOR DAMPING VIBRATIONS IN TOOL-HOLDING RODS, IN PARTICULAR BORING BARS, IN MACHINE TOOLS
17 Claims, 9 Drawing Figs.

[52] U.S. Cl. .................................................... 408/143
[51] Int. Cl. ..................................................... B23b 29/03
[50] Field of Search .......................................... 77/58, 58.2, 58 B

[56] References Cited
UNITED STATES PATENTS

| 2,591,115 | 4/1952 | Austin | 77/58 |
| 2,656,742 | 10/1953 | Poole | 77/58 |
| 3,230,833 | 1/1966 | Shurtliff | 77/58 |

Primary Examiner—Gerald A. Dost
Attorney—Wenderoth, Lind & Ponack

ABSTRACT: The invention relates to an adjustable device for damping vibrations in tool-holding rods, in particular boring bars in machine tools, comprising a damping mass located in an axial bore in the tool-holding rod and coupled thereto by means of at least one spring element and adapted to be subjected to a damping effect by means of a damping fluid which at least in part fills up the space between the damping mass and the bore, characterized in that the damping mass and the bore have a substantially conical basic shape and that the damping mass is axially adjustable in the bore.

PATENTED AUG 10 1971 3,598,498

INVENTOR
HANS KRISTIAN HOLMEN

BY Wenderoth, Lind & Ponack
ATTORNEYS

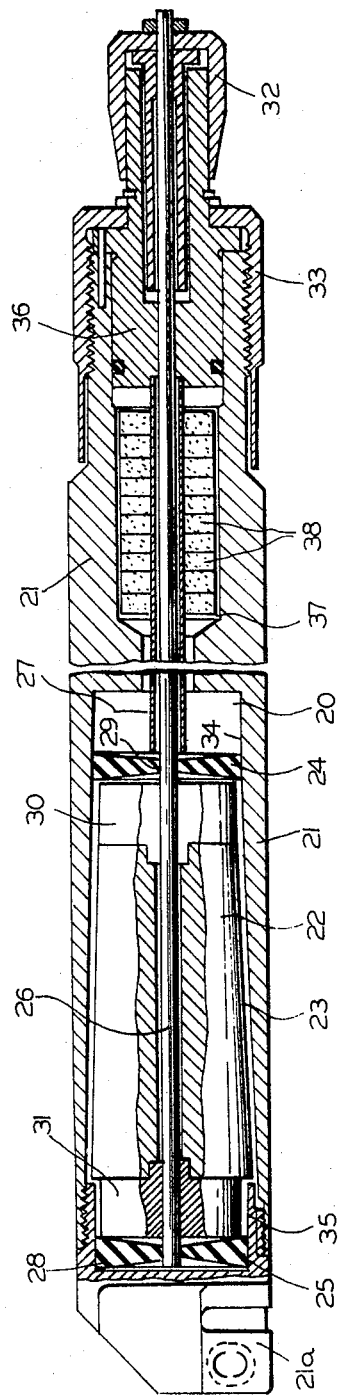
FIG. 9
FIG. 6
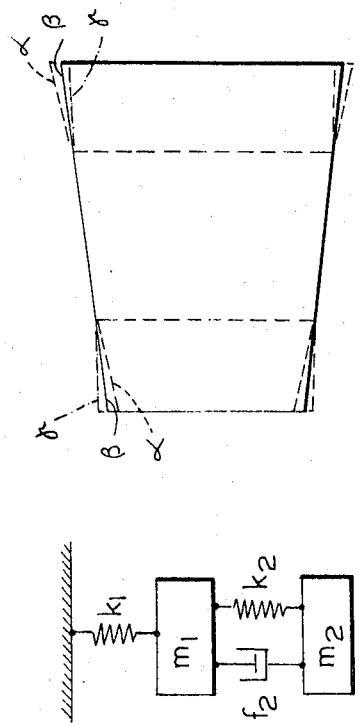
FIG. 8
FIG. 7
INVENTOR
HANS KRISTIAN HOLMEN
BY Wenderoth, Lind & Ponack
ATTORNEYS

ADJUSTABLE DEVICE FOR DAMPING VIBRATIONS IN TOOL-HOLDING RODS, IN PARTICULAR BORING BARS, IN MACHINE TOOLS

This invention relates to an adjustable device for damping vibrations in tool-holding rods, in particular boring bars, in machine tools, comprising a damping member or mass located in an axial bore in the tool holding rod and coupled thereto by means of one or more spring elements and adapted to be subjected to a damping effect by means of a damping fluid which wholly or in part fills up the space between the said mass and the bore.

When machining materials, for instance turning of metals in a lathe, increasing the rate of the working operation will lead to undesired vibrations or oscillations which prevent the completing of the working operation with the speed which is desired and which otherwise could be possible. The problem is particularly of interest when the machining tool because of the form of the work piece must be mounted on overhang more or less stiff arms, the so-called boring bars, for instance as is the case by interior working of cylinder surfaces.

It is an object of this invention to provide an adjustable device for vibration damping by means of which it will be possible to obtain the best damping conditions in the various practical instances, since the determining parameters of the damping device can be adjusted to the desired and optimum value in each case.

A new and advantageous damping device of the above type is according to the invention provided thereby that the damping mass and the bore have substantially conical basic shape and that said mass is axially movable in the bore. This makes possible among others that the gap between said mass and the bore can be varied.

In this way the damping constant can be adjusted continuously within a desired range in that the passage cross section of the damping medium in the space between the mass and the bore in the tool-holding rod can be varied when the mass is displaced axially in the conical bore. The continuous range of adjustment is determined by the dimensional relationship of the bore and the damping mass. Alternatively the damping constant in addition can be adjusted with respect to range through the choice of damping medium, for instance gas or liquids of different viscosities.

In a particular embodiment of the invention the rotational generatrix for the conical basic shape of the damping mass and the bore is stepwise rectilinear or moderately wave-shaped, preferably with a wave length equal to the length of the damping mass. By choosing such a rotational generatrix which deviates somewhat from the exact truncated cone shape of the conforming surfaces of the damping mass and the bore, specific mechanisms for enabling the adjustment of the spring constant may be omitted, since the variation of the axial position of the damping mass with a suitable form of rotational generatrix, can thus alone result i5 the desired spring force and damping force respectively, simultaneously within the interesting range of adustment. Depending upon the type and field of application of the tool-holding rod (boring bar, grinding spindle etc.), its shape, boring relations, clamping geometry and tool mass will be such that the changes taking place in the tool-holding rod as a result of wear or adjustment when the same is considered as an oscillating system do not always influence the mass of the system to the same degree as the stiffness thereof and vice versa.

When adjusting the parameters (spring constantand damping constant) of the damping system it will be possible to compensate for this nonlinear relationship between the desired damping and spring force as a function of the axial displacement of the damping mass, for instance thereby that the damping force is made to be progressively more sensitive to such displacement when the damping mass is moved from one of its end positions to the other.

This can be obtained as stated by making the rotational generatrix of the damping mass stepwise rectilinear, alternatively with a wave shape, and preferably substantially symmetrical about a point on the generatrix so that the damping force will act in the center of gravity of the mass, as explained more closely below, at the same time as the point of attack of the damping force can be concentrated in the center of gravity of the mass independently of the axial adjustment of the damping mass.

In addition to adjustment of the damping constant it is an advantage with certain embodiments of the invention to let at least one spring element be adjustable, so that the damping constant and the spring constant can be adjusted separately to the best value in each case.

According to a particularly advantageous embodiment of the invention there are provided two spring elements each in the form of an annular member or disk of rubber or similar elastic material located adjacent each end of the damping mass in planes normal to the axis of the tool-holding rod and adapted to engage the bore preferably with sufficient pressure to prevent the mass from sliding axially in the bore. This embodiment has proved to result in a structure being advantageous in practice and with regard to manufacturing. The spring elements are preferably located so that each will face one end of the damping mass with at least one clamp disk engaging each spring element and adapted to compress the same so that the spring constant can be increased.

According to another embodiment of the invention there is applied a spring element in the form of a spring rod supported in a sleeve being axially adjustable with respect to the tool-holding rod, said spring rod being axially adjustable with respect to the sleeve. This structure makes possible independent adjustment of the axial position of the damping mass and the free length of the spring rod, i.e. damping constant and spring constant respectively. The spring constant of the system is determined by the length of the spring rod between the clamping in the boring bar or sleeve, and in the damping mass respectively, of the cross section of the rod and the material therein. The length of the spring rod can be varied by means of the sleeve when the damping mass is maintained stationary in an unchanged axial position, and thus the spring constant can be adjusted continuously within a desired range.

In the case of an embodiment with clamping of one end of the spring rod in the tool-holding rod or in the sleeve, the other end of the spring rod is preferably connected to the damping mass with a freely pivotable spherical mounting with its center in the center of gravity of the damping mass. The equilibrium position of the damping mass is preferably determined in this case by small soft springs arranged in such a way that the center lines of the damping mass and the tool-holding rod coincide.

The invention will be explained more in detail in the following with reference to the drawing in which:

FIG. 6 shows in axial section a detail as indicated with letter D in FIG. 1.

FIG. 7 shows the equivalent oscillating systems in a diagrammatic and simplified way.

FIG. 8 shows the possible deviating shapes of the rotational generatrix of the damping mass.

FIG. 9 shows a partly axial section of a preferred embodiment of the damping device according to the invention.

Figure 1:
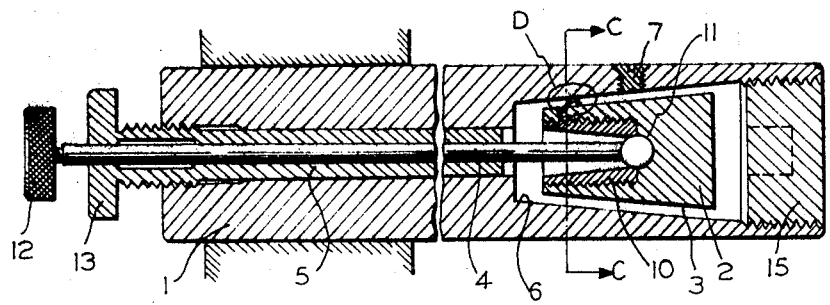
FIG. 1 shows a partial axial section of a tool-holding rod with a damping device according to an embodiment of the invention.

One of the most important causes of the arising of self-generated vibrations is that the inherent damping of the machine tool system is too small. This can be improved by incorporating a damping member in the system. The difficulty is that in many instances there is nothing in which to anchor the free end of the damping member, such as in the case for a long and thin boring bar. The same therefore can easily be brought into low-frequent transversal flectural vibrations.

A known solution to this problem is to anchor the damping member in an additional mass which can move with respect to the system which is to be damped.

To explain this method of damping more closely, reference is made to FIG. 7 of the drawing.

The additional or damping mass $m_2$ will here be incorporated in a separate oscillating system which can be tuned with respect to the values $m_1$—$k_1$ of the main system. For the purpose of illustration the inherent damping of the main system has been eliminated, since the same is negligible compared with the damping force $f_2$ of the additional mass system.

By correct adustment of the parameters, i.e. the spring constant $k_2$ and the damping constant $f_2$ in relation to the ratio between the masses $m_1$ and $m_2$, there will be a relative movement This movement the masses $m_1$ and $m_2$. This movement will carry out work in the damping member, and energy will be dissipated in the system, which means that the oscillations or vibrations are damped.

The optimum damping of the system is obtained with that value of the parameters which gives the maximum value of this work per unit time.

With a change in the equivalent mass or spring constant of the tool-holding rod, for instance when changing the effective length of the rod, with continuous or sudden change of the mass of the tool, for instance wearing of an abrasive disk or exchange of tool, the values of the parameters $m_1$ and $k_1$ will be changed. From the above it will appear that the invention permits such a change since adjustment of the parameters $f_2$ and $k_2$ will result in the attainment of optimum damping effect.

In the embodiments according to the invention as illustrated in figures 1—6 there is shown a tool-holding rod 1 clamped at its left end, a damping member or mass 2, a bore 6 for receiving the damping mass, a spring rod 4, an axially adjustable sleeve 5 which acts as a support or mounting for the spring rod, a damping medium 3 which can for instance be oil, and a closeable hole 7 for measurements of the spring constant of the system and introduction of damping medium.

Further this embodiment comprises a hollow threaded pin 10 with a concave spherical surface of engagement in one end for supporting and positioning of the damping mass 2 with respect to the end portion 11 of the spring rod, a rotatable knob 12 for moving the spring rod 4 in the sleeve 5, a second rotatable knob 13 for moving the sleeve 5 in the tool-holding rod 1 and a number of auxiliary springs 14 which keep the damping mass in its equilibrium position and guide the same during vibratory movements without interfering to any appreciably degree in the spring force in the main spring 4. The auxiliary or guide springs 14 according to FIGS. 5 and 6 can be replaced by for instance a centrally located spring.

The actuating knobs 12 and 13 shown can have scale arrangements for the indication of the axial position of the damping mass in the bore, alternatively of the damping constant, and of the free length of the spring rod, alternatively of the spring constant.

Figure 3:
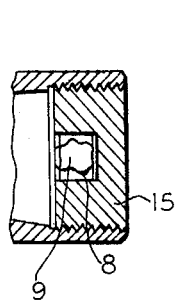
FIG. 3 shows in axial section a detail of the structure at the right end of the device in FIG. 1.
Figure 4:
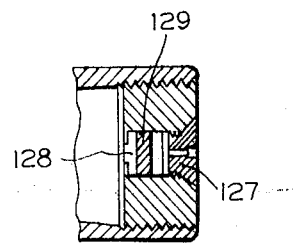
FIG. 4 shows another embodiment of the same detail as in FIG. 3.
Figure 5:
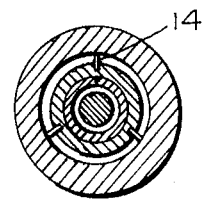
FIG. 5 is a cross section according to the line C–C in FIG. 1.

Because of the volume variation when the spring rod is pushed more or less into the bore there is provided a cavity 8 in the sealing cap 15 (see FIG. 3) in which there is arranged an expansion tank 9 (for instance an airfilled container of plastic sheet) which can be compressed and expanded according to volume changes which among others are due to the movements of the sleeve 5 and the spring 4. An alternative construction of the expansion tank according to FIG. 3 is shown in FIG. 4, in which the cavity 8 is replaced by a cylinder 128 in which the piston 129 divides between the damping medium and the atmosphere by a screw 127 being provided with a through hole.

Figure 2:
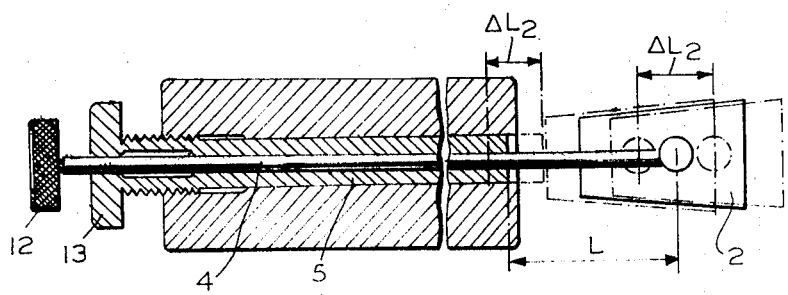
FIG. 2 is a diagrammatic and simplified section like FIG. 1 and shows some dimensional relationships of importance to the range of adjustment of the device.

FIG. 2 shows the free length L of the spring rod with the range of variation $\Delta L_1$ and said range of adjustment $\Delta L_2$ for adjustment of the damping constant. These values are determined in the choice of dimensions of the damping mass and the bore.

A rotational generatrix modified according to FIG. 8 and following the dotted line marked $\alpha$, will—provided that the bore in the tool-holding rod has substantially the same shape—result in an increased sensitivity to changes in the average gap width when the damping mass is positioned in the neighborhood of its left end position and is given a further axial displacement, than when the damping mass is positioned adjacent its right hand end position. Correspondingly a rotational generatrix which follows the dotted line $\gamma$ will result in the opposite effect.

The full line rotational generatrix $\beta$, will result in a linear relationship between gap width and axial displacement.

The stepwise rectilinear rotational generatrix can be smoothed out to a wave shape while maintaining the above explained nonlinear effect.

It is obvious that the above described embodiment can also work satisfactorily without any adjustment possibility for the spring constant, i.e. without displacable sleeve 5. This modification is specifically of interest with a modified rotational generatrix according to FIG. 8.

Where it is most practical the sleeve 5 and the spring 4 can be extended outwardly through the sealing cap 15 so that the knobs 12 and 13 will be located at the free end of the tool-holding rod. It is further obvious that embodiments corresponding to those in FIGS. 1 and 2 can also be applied with a spring rod clamped in both ends, but in such case the structure will be somewhat more complicated than in the illustrated exemplary embodiment above. As regards the interrelated conical shapes of the damping mass and the bore it will be understood that other modifications or deviations than the above wave shape are possible, Thus for instance the degree of conicity of the damping mass and the bore can be chosen different.

The presently preferred embodiment of the invention is shown in FIG. 9 of the drawings. Corresponding to what is shown in FIGS. 1—6 there is here provided a tool-holding rod 21 adapted to be clamped at its right-hand end being formed with bore 20 for receiving the damping member or mass 22. The bore and the damping mass have according to the basic idea of this invention substantially conical shape and the damping mass is axially adjustable in the bore, as will be explained below.

In this embodiment the spring elements are in the form of rubber disks 24 and 25 adapted to engage each one end surface of the damping mass 22 which can be provided with separate end pieces 30 and 31 possibly with a cylindrical shape. For clamping the rubber disks there is further provided clamping disks 28 and 29 attached to a bolt or rod 26 and a hollow rod 27 respectively, concentric thereto. These rods are extended outwards to actuating knobs 32 and 33 respectively for independent adjustment of the spring constant and the damping constant in a way similar to that explained in connection with FIGS. 1—6.

The damping constant is adjusted by axial displacement of the damping mass 22 in the bore 20 so that the intermediate gap 23 which is filled with the damping medium, is changed. This change takes place by means of the knob 33 being threaded on the exterior of an end portion of the tool holding rod 21 and being connected to the hollow rod 27 through a plug 36. The spring constant is adjusted by a larger or smaller degree of compression of the rubber disks 24 and 25 between the respective end faces of the damping mass and the cooperating clamping disks 29 and 28 respectively, this being brought about by mutual rotation of the rods 26 and 27, the knob 32 being threadedly connected with the plug 36.

The bore 20 preferably has a cylindrical portion 34 and 35 respectively in the region of each rubber disk 24 and 25, so that axial displacement of the damping mass does not at the same time influence the spring constant. The cylindrical portion 35 at the left-hand end is provided in a specific end member 21a which is threaded into the free end of the tool-holding rod and serves among others to support the tool.

As expansion means in this embodiment there is provided a number of disk-shaped elements 38 of cell rubber arranged in a separate cavity 37 in the tool-holding rod concentrically with the bore 20 and the rods 26 and 27.

The rods 26 and 27 mainly have for function to provide for the desired axial adjustment of the damping mass 22 and for the adjustment of the compression of the rubber disks 24 and 25. The rods per se do not constitute any part of the spring elements which determine the spring constant. Nor are the same necessarily alone adapted to resist possible axial forces in the damping mass, since the rubber disks preferably are engaging the bore 22 with a sufficient pressure to prevent the damping mass from sliding axially in the bore.

Among others for the above reason it is an advantage that the clamping disks and possibly the damping mass have conical surfaces for engaging the adjacent rubber disk so that axial displacement of the clamping disk towards the rubber disk will cause a certain radial expansive extensive movement thereof.

The type and the mounting of the tool is not shown in the above figures since the invention gives a universal solution for the damping of transverse oscillations in long and thin rods clamped at one end. Thus the damping system can be applied both with boring bars and in grinding spindles etc.

What I claim is:

1. Adjustable device for damping vibrations in tool-holding rods, in particular boring bars in machine tools, comprising a damping mass located in an axial bore in the tool-holding rod and coupled thereto by means of at least one spring element and adapted to be subjected to a damping effect by means of a damping fluid which at least in part fills up the space between the damping mass and the bore, characterized in that the damping mass and the bore have a substantially conical basic shape and that the damping mass is axially adjustable in the bore.

2. Device according to claim 1, characterized in that the rotational generatrix for the conical basic shape of the damping mass and bore is stepwise rectilinear.

3. Device according to claim 1, characterized in that the rotational generatrix for the conical basic shape of the damping mass and the bore is a moderate wave shape, preferably with a wave length equal to the length of the damping mass.

4. Device according to claim 1, characterized in that at least one spring element is adjustable.

5. Device according to claim 4, characterized in that there are provided two spring elements each being in the form of a disk of rubber or similar elastic material each located adjacent one end of the damping mass in planes normal to the axis of the tool-holding rod and adapted to engage the bore, preferably with a sufficient pressure to prevent the damping mass from sliding axially in the bore.

6. Device according to claim 1, characterized by a spring element in the form of a spring rod being mounted in a sleeve which is axially adjustable with respect to the tool-holding rod, said spring rod being axially adjustable in relation to the sleeve.

7. Device according to claim 5, characterized in that the spring elements are located facing one end of the damping mass with at least one clamping disk engaging each spring element and adapted to compress the same so that the spring constant can be increased.

8. Device according to claim 7, characterized in that the clamping disks have a conical surface of engagement facing the adjacent spring element so that axial displacement of the clamping disks towards the corresponding spring element will cause a certain radial expansion of the spring element.

9. Device according to claim 7, characterized by a through threaded bolt which when tightened is adapted to adjust the compressing force of the clamping disk against the spring elements at both ends of the damping mass.

10. Device according to claim 8, characterized in that the through bolt is hollow for transporting a cooling fluid.

11. Device according to claim 5, characterized in that the bore is provided with a cylindrical portion for the engagement of the spring elements.

12. Device according to claim 6 and with clamping of the spring rod at one end in the tool-holding rod, characterized in that the damping mass in its center of gravity is mounted pivotally about at least an axis normally to the spring rod, preferably with spherical mounting at the end of the spring rod.

13. Device according to claim 12, characterized in that the damping mass on its substantially conical outer surface is provided with auxiliary springs adapted to engage the bore and guide the movements of the damping mass therein.

14. Device according to claim 6, characterized in that the spring rod and the sleeve are arranged concentrically in the tool-holding rod and that one end of the spring rod and the sleeve preferably adjacent the rear end of the tool-holding rod is provided with actuating knobs or the like with cooperating scale arrangements for indication of the axial position of the damping mass in the bore, alternatively of the damping constant, and of the free length of the spring rod, alternatively of spring constant.

15. Device according to claim 1, characterized in that the volume of the bore is automatically adjustable, for instance by means of an expansion container or the like.

16. Device according to claim 15, characterized in that the volume of the bore is automatically adjustable by means of at least one cell rubber element.

17. Device according to claim 1, characterized by a closable opening in the wall surrounding the bore in the tool holding rod, said opening being adapted for the introduction of a sensing member on a measuring apparatus for the measurement of the deflection of the damping mass under the influence of gravity and thus the spring constant, and besides adapted for the introduction of a damping fluid.